Patented Jan. 31, 1950

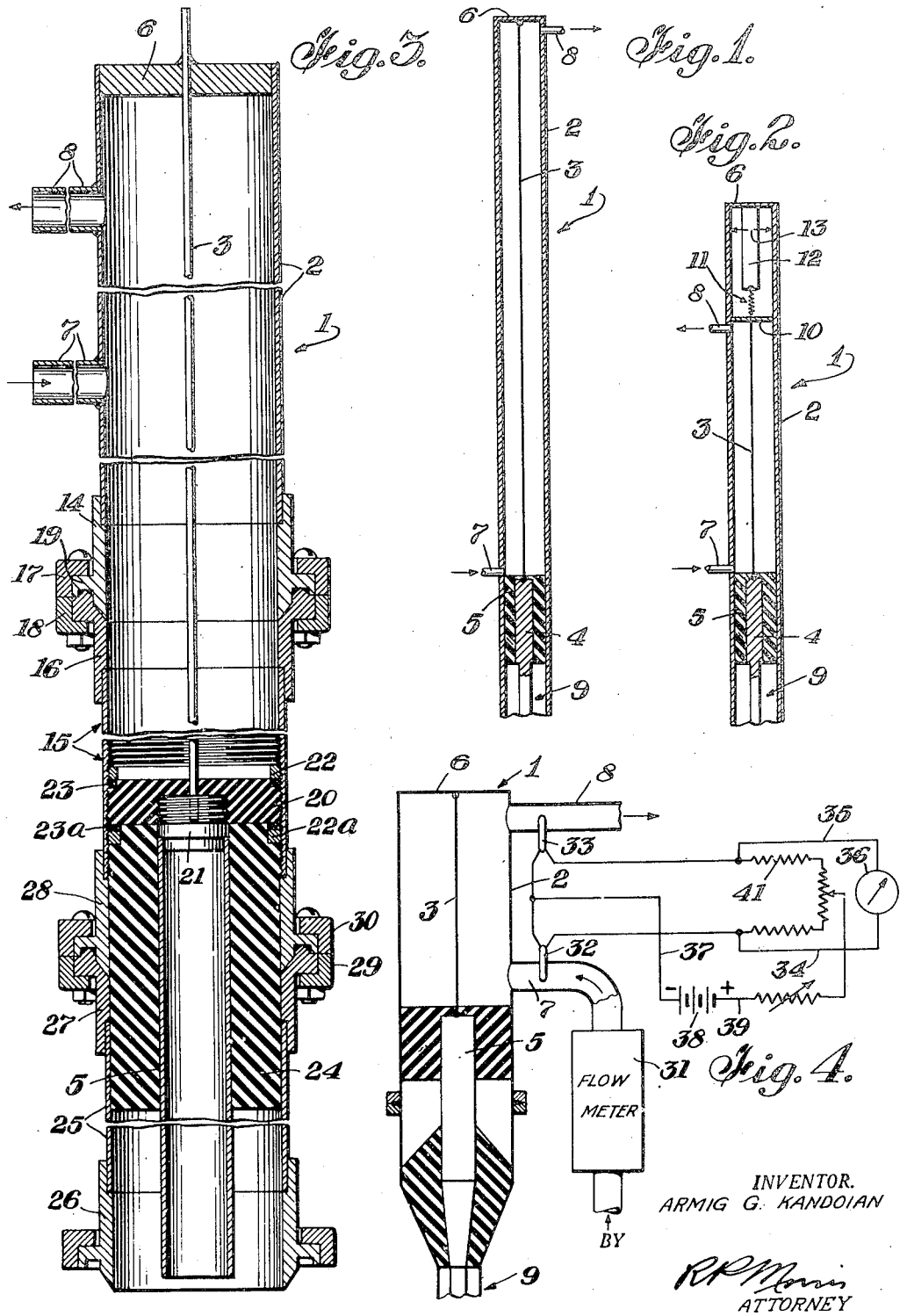

2,495,733

UNITED STATES PATENT OFFICE 2,495,733

RADIO-FREQUENCY ARTIFICIAL LOAD

Armig G. Kandoian, New York, N. Y., assignor to Federal Telephone and Radio Corporation, New York, N. Y., a corporation of Delaware Application June 22, 1945, Serial No. 600,859

7 Claims. (Cl. 171—95)

This invention relates to artificial or dummy radio frequency loads and more particularly to ultra high frequency dummy loads for operation over a wide frequency band.

For the purpose of testing various radio equipment it is necessary to provide artificial or dummy loads. These loads preferably should be made as compact as possible and must be capable of dissipating large amounts of energy. Furthermore, it is useful to be able to measure the energy dissipated in such artificial or dummy loads in testing the performance of radio frequency equipment.

It is an object of my invention to provide an artificial load designed on the principles of an infinite transmission line of high attenuation.

It is a further object of my invention to provide an artificial load in the form of a liquid filled line wherein a liquid, preferably water, is used as a cooling and energy dissipating medium.

It is the still further object of my invention to provide an artificial load in the form of a coaxial transmission line which may be untuned and in which a cooling liquid of high dielectric constants such as water is used for dissipating the energy in the load.

It is a still further object of my invention to provide an artificial load in the form of a substantially untuned coaxial line into which a cooling and energy dissipating fluid of high dielectric constants such as water is used and to provide means for matching the impedance of this artificial load to the line or other equipment to which it is coupled.

It is a still further object of my invention to provide an artificial load of the transmission line type cooled by a liquid dielectric such as water wherein the energy dissipated in the loads may be measured by measuring the temperature difference and the flow rate of the water within the line section.

According to a feature of my invention, I provide a length of line having a hollow outer and an inner conductor. At one end there is provided an insulating bushing filling the space between the inner and outer conductor to make the unit water-tight. At the other end the inner and outer conductors are shorted together and a cooling dielectric such as water is caused to flow continuously within the chamber formed by the outer conductor. Preferably the inner conductor is made of some high resistance material such for example, as Kovar and is made relatively small with respect to the outer diameter of the line.

With such an arrangement the impedance is generally relatively low and considerably below that of standard transmission lines which may for example be in the order of 50 ohms. Accordingly, for operation over a relatively wide frequency band I prefer to provide an impedance transformer which may consist of another section of coaxial line with a solid dielectric made electrically a quarter of a wavelength long.

In the inlet and outlet connection for the water-cooling may be provided temperature measuring means so that the difference in temperature of the input and output water may be readily obtained. With this temperature rise and with a knowledge of the rate of flow of the cooling fluid the power dissipated in the load may be quite readily calculated.

According to a further feature of my invention I may provide a terminating means for the artificial line consisting of a small resistance element and a tunable sliding short-circuiting arrangement which will serve to adjust the impedance of the line.

A better understanding of my invention, the objects and features thereof may be had from the particular description of a few embodiments thereof made with reference to the accompanying drawings in which:

Fig. 1 is a diagrammatic illustration of an artificial line coupled to a standard transmission line incorporating the features of my invention;

Fig. 2 is a modified form of artificial load similar to that shown in Fig. 1;

Fig. 3 is a cross-sectional view illustrating the structural features of an artificial line arrangement in accordance with my invention; and Fig. 4 is a schematic diagram illustrating the coupling of the temperature difference measuring arrangement to the artificial load in accordance with my invention.

In Fig. 1, the diagrammatic showing of the untuned coaxial line load is made. This comprises a concentric transmission line 1 comprising an outer conductor 2 and an inner conductor 3. Inner conductor 3 is a relatively fine wire preferably of high resistance material such as Kovar. At one end inner conductor 3 is connected to a larger inner conductor section 4 which may be sealed by means of a sealing dielectric 5 to outer conductor 2. This dielectric 5, preferably fits between conductors 2 and 4 and 2 and 3 to form a water-tight seal. At the other end conductors 2 and 3 are interconnected by means of the short circuiting end portion 6 which also forms a water-tight seal. Thus, the outer conductor 2 with the two sealing members 5 and 6 provides a tank circuit capable of holding a fluid. An inlet pipe is provided at 7 and on outlet pipe at 8 so that the dielectric material such as water may be circulated within the chamber formed by coaxial line 1. While any dielectric may be used water is preferred since it is relatively cheap and has a high dielectric constant. The high dielectric constant provides a slow rate of propagation of the electromagnetic wave of a long line 1 thus making the line effectively a plurality of wavelengths long for a relatively short physical length. Water also has a high power factor and provides enough attenuation to greatly reduce reflection from the shorted end of the line and simultaneously serves to absorb the energy from the transmitter. The water also acts as a cooling medium, being continuously circulated to the coaxial line. By making the center conductor 3 of high resistance material such as Kovar, additional attenuation is provided. Thus in a relatively short length of line the energy may be substantially attenuated.

The transmission line 1 presents a relatively low impedance to a standard coaxial cable such as shown coupled at 9. Accordingly it is preferable to provide a matching impedance line transformer intermediate lines 9 and 1. This line may comprise the inner conductor 4 and the section of outer conductor 2 adjacent thereto. By using a high dielectric insulating material this matching section may be made effectively a quarter of a wavelength long without a great physical length since the high dielectric constants of the insulating material will provide a low rate of propagation along this portion of the line. By using polystyrene as dielectric a standard 50 ohm line such as 9 may be properly converted for impedance matching with low impedance line 1.

In Fig. 2 is shown substantially the same type of transmission line 1 as was shown above in Fig. 1. However, means is provided herein to adjust the impedance of line 1 for use over slightly different frequency ranges. According to this arrangement a dielectric spacer 10 may be provided at one end of conductor 3 and a small resistance unit 11 provided. Resistance unit 11 is connected to a larger rod 12 as an inner conductor, which in turn is connected to the shorting end 6 of line 1. A sliding short-circuiting means 13 is provided for interconnecting rod 12 and outer conductor 2 at variable points to adjust the impedance of the line. With this added impedance adjusting means reflections which might tend to occur at a particular frequency may be avoided. It is simply necessary to adjust the tuning element 13 to such a point that these reflections are overcome. The dielectric portion 10 may, if desired, serve as a water-tight connection between conductors 2 and 3 to limit the cooling chamber to the portion of the line as shown therebelow. However, it is also permissible to have the water circulate over the entire line if desired.

In Fig. 3 is shown a practical constructed unit of artificial load of the type shown diagrammatically in Fig. 1. According to this arrangement the portion of line 1, consisting of outer conductor 2 and inner conductor 3 may be closed at its shorted end by metallic plate 6 which is soldered to both conductors. Inlet and outlet pipes 7 and 8 are soldered to widely spaced parts of outer line 2. A clamping collar 14 is fastened to outer conductor 2 by any suitable means such as soldering. A second section of coaxial line conductor 15 is provided with internal threads and has soldered to it at one end a collar 16. Collars 14 and 16 form flanges arranged to fit together and be clamped in place by means of clamping members 17, 18 together with a suitable water gasket 19 to provide a water-tight joint. In line section 15 is provided a spacer of dielectric material 20 carrying at its center a metallic core 21 which serves as a connecting plug for coupling to the inner conductor of a coaxial line of larger diameter than inner conductor 3. The end of inner conductor 3 is fastened securely to connecting plug 21. The insulating spacer 20 is clamped between two clamping rings 22 and 22a threaded into the thread of section 15, and is rendered water-tight by means of gaskets 23 and 23a. The impedance transformer section includes the inner conductor 5, which may be made of the same diameter as the inner conductor of the coaxial line to be coupled thereto, and an insulating spacer of dielectric material 24. This insulating spacer 24 is provided with abutting shoulders so that it will fit tightly against spacer 20 and the clamping ring 22a. One end of spacer 24 may be fitted within the outer conductor 25 of the transformer section, the extending end of which forms a coupling arrangement for coupling to the regular transmission line by the provision thereon of clamping member 26. At the end of outer conductor 25 adjacent line 1, is provided the flanged ring 27 and a corresponding flanged ring 28 is provided at the adjacent end of abutted line 15. This ring 28 is of proper diameter to fit over insulating spacer 24 and substantially to interlock with 27. Clamping rings 29 and 30 are provided to fit over the flanges of rings 27 and 28 to hold the parts together upon assembly.

In an artificial load of the type disclosed herein in which the outer conductor is made of 1⅝" tubing, the line being in the neighborhood of 4 feet long, it has been found that in the neighborhood of 575 megacycles the line has a band width of 100 megacycles with only a standing wave ratio at extreme ends of the band at 1.5 to 1. This load is capable of handling a peak power input of 300 kilowatts with an average power input of 150 watts. The unit as made was matched by means of an impedance transformer to a standard 50 ohm coaxial cable line.

While I have described above the power dissipating properties of the dummy or artificial load in accordance with my invention it is clear that the power dissipated in the load may be readily measured. This may be simply done by measuring the temperature rise of the cooling water in passing through the line when the rate of flow of the water is known. In Fig. 4 is illustrated a schematic circuit diagram of a system suitable for obtaining a measurement of the power output of the load in accordance with my invention. In this arrangement a flow meter 31 is provided in water inlet 7. Temperature measuring thermo-elements 32 and 33 shown as thermistor beads are provided in inlet 7 and outlet 8 respectively. The output energy from thermo-elements 32 and 33 is applied over lines 34 and 35 respectively to an indicating meter 36. The two thermoelements are connected over line 37 to the negative terminal of a source 38. The positive terminal of source 38 is connected through line 39, resistance 40 and the balancing resistor-potentiometer 41 to the other terminals of thermoelements 32 and 33. Thus a measure of the temperature difference is obtained on meter 36 and the rate of flow is obtained in the meter 31.

The power in watts dissipated may be obtained from the following formula:

$$\text{Watts} = 264\, g\Delta T$$

where $g$ = flow of water in gallon/min. and $\Delta T$ = temperature rise in °C.

It will be clear that instead of using thermoelements as described other types of temperature measuring instruments may be used if desired.

From the foregoing description the principles of my invention should be clear. It will also be clear to those skilled in the art that many modifications of my invention may be readily devised by those skilled in the art without departing from the spirit thereof. The particular illustrations are given merely by way of example and are not intended as any limitation on the scope of my invention as set forth in the objects thereof and the accompanying claims.

I claim:

1. An artificial dissipating load comprising a coaxial line having a hollow outer conductor and an inner conductor, insulating means filling the opening between said inner and outer conductors at one end of said line, a water tight connection between said inner and outer conductors providing an electrical connection between said conductors spaced from said insulating means a predetermined distance such that said line is effectively a plurality of wavelengths long at the operating frequencies, fluid inlet and outlet means in said outer conductor between said insulating means and said water tight means for circulating water dielectric through the chamber formed by sai outer conductor, impedance transformer means coupled to said coaxial line at said one end for transforming the impedance of said coaxial line to that of a transmission line to be coupled thereto and a resistance means in said inner conductor adjacent said short-circuiting means.

2. An artificial dissipating load comprising a coaxial line having a hollow outer conductor and an inner conductor, a water tight insulating means between said inner and outer conductors at one end of said line, a short-circuiting means forming a second water tight connection between said inner and outer conductors spaced from said insulating means a predetermined distance such that said line is effectively a plurality of wavelengths long at the operating frequencies, fluid inlet and outlet means in said outer conductor between said insulating means and said second water tight means for circulating water dielectric through the chamber formed by said outer conductor, impedance transformer means coupled to said coaxial line at said one end for transforming the impedance of said coaxial line to that of a transmission line to be coupled thereto, a resistance means in said inner conductor adjacent said short-circuiting means, and slidable short-circuiting connection intermediate said resistance means and said short-circuit means whereby the impedance of said coaxial line may be adjusted.

3. An artificial dissipating load for operation over a relatively wide high radio frequency band, comprising a coaxial line having a hollow outer conductor and a relatively small inner conductor of high resistance material, a water tight insulating means between said inner and outer conductors at one end of said line, a short-circuiting means forming a second water tight connection between said inner and outer conductors spaced from said insulating means a predetermined distance such that said line is effectively a plurality of wavelengths long at the operating frequencies, fluid inlet and outlet means in said outer conductor between said insulating means and said second water tight means for circulating water dielectric through the chamber formed by said outer conductor, impedance transformer means including a solid dielectric quarter wavelength coaxial line section coupled to said coaxial line at said one end for transforming the impedance of said coaxial line to that of a transmission line to be coupled thereto, and a low resistance means in said inner conductor adjacent said short-circuiting means.

4. An artificial dissipating load for operation over a relatively wide high radio frequency band, comprising a coaxial line having a hollow outer conductor and a relatively small inner conductor of high resistance material, a water tight insulating means between said inner and outer conductors at one end of said line, a short-circuiting means forming a second water tight connection between said inner and outer conductors spaced from said insulating means a predetermined distance such that said line is effectively a plurality of wavelengths long at the operating frequencies, fluid inlet and outlet means in said outer conductor between said insulating means and said second water tight means for circulating water dielectric through the chamber formed by said outer conductor, impedance transformer means including a solid dielectric quarter wavelength coaxial line section coupled to said coaxial line at said one end for transforming the impedance of said coaxial line to that of a transmission line to be coupled thereto, a low resistance means in said inner conductor adjacent said short-circuiting means, and slidable short-circuiting connection intermediate said resistance means and said short-circuit means whereby the impedance of said coaxial line may be adjusted.

5. An artificial dissipating load for operation over a relatively wide high radio frequency band, comprising a coaxial line having a hollow outer conductor and an inner conductor a liquid tight insulating means between said inner and outer conductors at one end of said line, a short-circuiting means forming a second liquid tight connection between said inner and outer conductors spaced from said insulating means a predetermined distance such that said line is effectively a plurality of wavelengths long at the operating frequencies, fluid inlet and outlet means in said outer conductor between said insulating means and said second liquid tight means for circulating water dielectric through the chamber formed by said outer conductor, impedance transformer means coupled to said coaxial line at said one end for transforming the impedance of said coaxial line to that of a transmission line to be coupled thereto, a low resistance means in said inner conductor adjacent said short-circuiting means, slidable short-circuiting connection intermediate said resistance means and said short circuiting means, temperature measuring means in said inlet and outlet means, and a flow measuring means for measuring the flow of water into said chamber, whereby the power dissipation may be measured.

6. An artificial dissipating load for operation over a relatively wide high radio frequency band, comprising a coaxial line having a hollow outer conductor and an inner conductor a liquid tight insulating means between said inner and outer conductors at one end of said line, a short-circuiting means forming a second liquid tight connection between said inner and outer conductors spaced from said insulating means a predetermined distance such that said line is effectively a plurality of wavelengths long at the operating frequencies, fluid inlet and outlet means in said outer conductor between said insulating means and said second water tight means for circulating water dielectric through the chamber formed by said outer conductor, impedance transformer means including a quarter wavelength line section coupled to said coaxial line at said one end for transforming the impedance of said coaxial line to that of a transmission line to be coupled thereto, a low resistance means in said inner conductor adjacent said short-circuiting means slidable short-circuiting connection intermediate said resistance means and said short-circuiting means, temperature measuring means in said inlet and outlet means, and a flow measuring means for measuring the flow of water into said chamber, whereby the power dissipation may be measured.

7. An artificial dissipating load for operation over a relatively wide high radio frequency band, comprising a coaxial line having a hollow outer conductor and a relatively small inner conductor of high resistance material, a water tight insulating means between said inner and outer conductors at one end of said line, a short-circuiting means forming a second water tight connection between said inner and outer conductors spaced from said insulating means a predetermined distance such that said line is effectively a plurality of wavelengths long at the operating frequencies, fluid inlet and outlet means in said outer conductor between said insulating means and said second water tight means for circulating water dielectric through the chamber formed by said outer conductor, impedance transformer means including a solid dielectric quarter wavelength coaxial line section coupled to said coaxial line at said one end for transforming the impedance of said coaxial line to that of a transmission line to be coupled thereto, a low resistance means in said inner conductor adjacent said short-circuiting means and slidable short-circuiting connection intermediate said resistance means and said short-circuiting means whereby the impedance of said coaxial line may be adjusted, temperature measuring means in said inlet and outlet means, and a flow measuring means for measuring the flow of water into said chamber, whereby the power dissipation may be measured.

ARMIG G. KANDOIAN.

REFERENCES CITED

The following references are of record in the file of this patent:

UNITED STATES PATENTS

| Number | Name | Date |
|---|---|---|
| 1,958,255 | Weir | May 8, 1934 |
| 2,129,711 | Southworth | Sept. 13, 1938 |
| 2,262,134 | Brown | Nov. 11, 1941 |
| 2,284,379 | Dow | May 26, 1942 |
| 2,387,158 | Kazanowski | Oct. 16, 1945 |
| 2,398,606 | Wang | Apr. 16, 1946 |
| 2,399,930 | Keister | May 7, 1946 |
| 2,410,707 | Bradley | Nov. 5, 1946 |